United States Patent
Truong

(10) Patent No.: US 7,210,046 B2
(45) Date of Patent: Apr. 24, 2007

(54) SYSTEM, METHOD AND SOFTWARE FOR POWER MANAGEMENT IN A STYLUS INPUT ENABLED INFORMATION HANDLING SYSTEM

(75) Inventor: Luc Dinh Truong, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 405 days.

(21) Appl. No.: 10/764,109

(22) Filed: Jan. 23, 2004

(65) Prior Publication Data

US 2005/0166076 A1    Jul. 28, 2005

(51) Int. Cl.
*G06F 1/26* (2006.01)
(52) U.S. Cl. .................. 713/300; 713/323; 345/179; 340/568
(58) Field of Classification Search ............. 713/323; 345/179; 340/568.1
See application file for complete search history.

(56) References Cited

U.S. PATENT DOCUMENTS

| | | | |
|---|---|---|---|
| 5,396,443 A | 3/1995 | Mese et al. | 364/707 |
| 5,483,262 A * | 1/1996 | Izutani | 345/179 |
| 5,488,575 A | 1/1996 | Danielson et al. | 364/707 |
| 5,568,409 A | 10/1996 | Neoh | 364/702 |
| 5,617,343 A | 4/1997 | Danielson et al. | 364/707 |
| 5,850,358 A | 12/1998 | Danielson et al. | 364/707 |
| 5,889,237 A * | 3/1999 | Makinwa | 178/18.01 |
| 5,909,382 A | 6/1999 | Neoh | 364/709.11 |
| 5,973,677 A * | 10/1999 | Gibbons | 345/179 |
| 6,114,958 A * | 9/2000 | Murphy | 340/568.1 |
| 6,144,976 A | 11/2000 | Silva et al. | 708/100 |
| 6,233,464 B1 * | 5/2001 | Chmaytelli | 455/556.2 |
| 6,473,076 B1 * | 10/2002 | Thompson et al. | 345/179 |
| 6,681,333 B1 * | 1/2004 | Cho | 713/300 |
| 2002/0103616 A1 * | 8/2002 | Park et al. | 702/150 |

OTHER PUBLICATIONS

US 5,680,334, 10/1997, Silva et al. (withdrawn)

* cited by examiner

*Primary Examiner*—Thomas Lee
*Assistant Examiner*—Sean Weinman
(74) *Attorney, Agent, or Firm*—Baker Botts L.L.P.

(57) ABSTRACT

A system, method and software for managing power, operating states and transition within a stylus based information handling system (IHS) are provided. In one aspect, a parking garage operable to detect the presence of an IHS stylus is provided. When the stylus is detected in the parking garage, an IHS digitizer operable to receive stylus input may be operated in a reduced power state. The stylus may include a switch operable in association with the parking garage which enables a stylus power supply to be disengaged when the stylus is parked in the stylus garage. In response to one or more transition events, such as a power down or migration to a reduced IHS operating state, one or more user notifications may be generated in response to a determination that the stylus has been misallocated or is not parked in the stylus garage.

18 Claims, 2 Drawing Sheets

SYSTEM, METHOD AND SOFTWARE FOR POWER MANAGEMENT IN A STYLUS INPUT ENABLED INFORMATION HANDLING SYSTEM

TECHNICAL FIELD

The present invention relates generally to information handling systems and, more particularly, to information handling system power management.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Today, pen or stylus input based information handling systems, such as tablet PCs (personal computers) as well as personal digital assistants, are becoming more prevalent. With an electronic stylus or pen, tablet input enabled information handling system users may control various aspects of their information handling systems, create handwritten documents by writing directly on an information handling system LCD (liquid crystal display) screen, as well as perform other tasks.

To operate, tablet input enabled information handling systems generally require a digitizer and a stylus or pen. The stylus or pen may be generally defined as an input device that interfaces with the digitizer typically by way of magnetic field induction to generate input. To receive input, the digitizer typically requires power from the information handling system. With some technologies, the stylus or pen may also be powered, typically via one or more battery or DC (direct current) power supplies.

Many tablet input enabled information handling systems consume power at a greater rate than that of their counterparts. Typically operable to receive input from multiple sources, e.g., stylus input and/or keyboard input, many conventional tablet input enabled information handling systems concurrently power an included digitizer to facilitate stylus or pen input as well as one or more controllers operable to receive input from such input devices as keyboards, mouse, voice, etc. As a result, tablet input enabled information handling systems often exhaust fixed power resources more rapidly than conventional input information handling systems.

SUMMARY

In accordance with teachings of the present disclosure, an information handling system including at least one processor, memory operably associated with the processor and a stylus garage operably associated with the processor is provided. In a preferred embodiment, the stylus garage is preferably operable to removably engage at least one stylus. The information handling system preferably also includes a digitizer operably coupled to the processor and the memory. In operation, the processor is preferably operable to determine a parking status of the stylus in the stylus garage and to effect one or more information handling system power states in response to the parking status of the stylus in the stylus garage.

Also in accordance with teaching of the present disclosure, software for managing power in an information handling system is provided. According to teachings of the present disclosure, software is preferably embodied in computer readable media and when executed operable to determine whether a stylus is parked in a stylus garage of the information handling system. The software is preferably further operable to permit operation of the information handling system in one or more operating states depending on results of the stylus parking status determination.

Further in accordance with teachings of the present disclosure, a method for powering an information handling system is provided. The method preferably includes maintaining availability of a plurality of information handling system operating states and effecting a selected operating state according to a stylus parking status in an information handling system stylus garage.

In one aspect, teachings of the present disclosure provide the technical advantage of reducing stylus misallocation in stylus input enabled information handling systems.

In another aspect, teachings of the present disclosure provide the technical advantage of reducing digitizer power consumption by anticipating stylus input.

In still another aspect, teachings of the present disclosure provide the technical advantage of managing powered stylus power consumption by enabling a powered stylus to be powered down when not in use.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
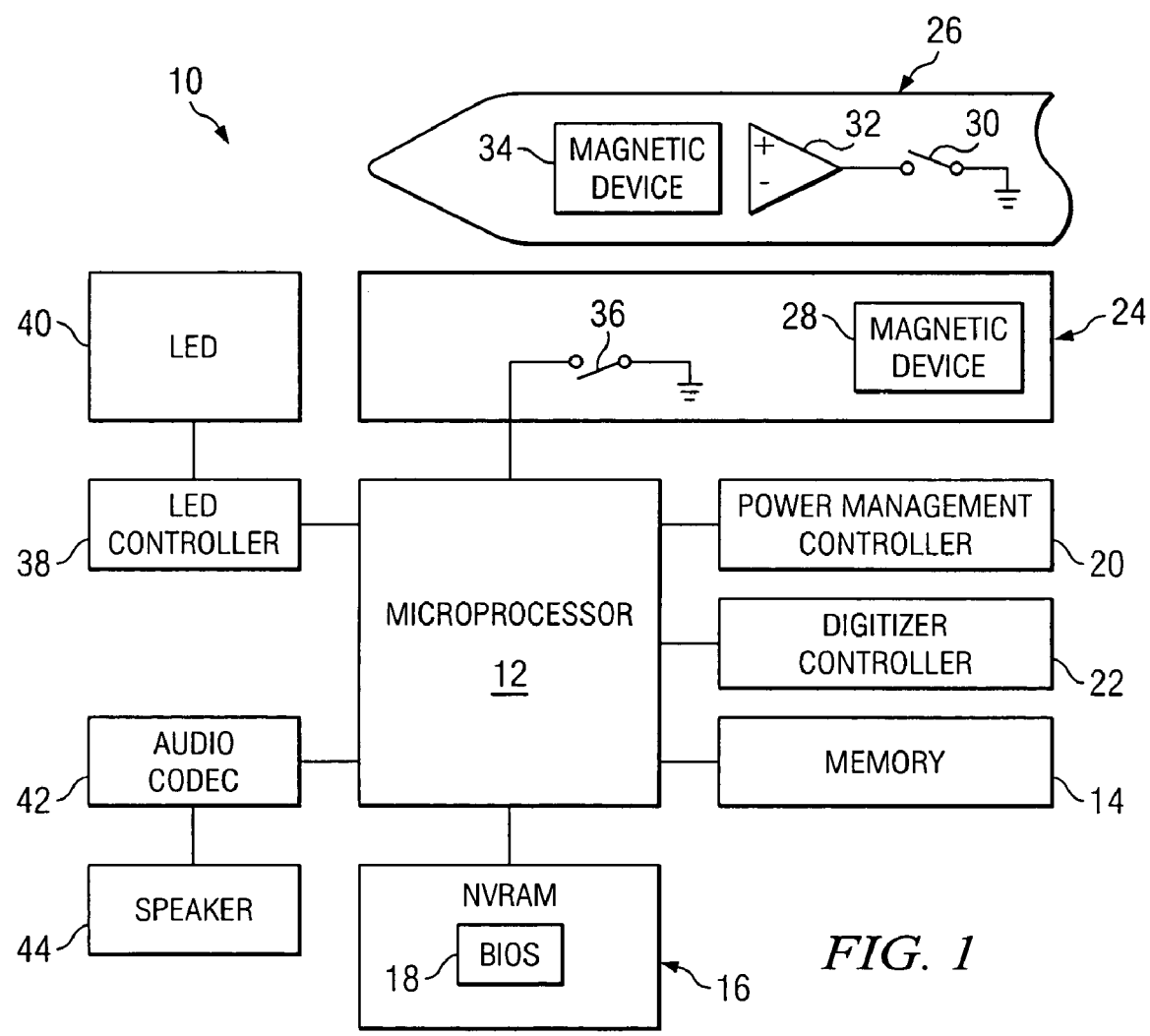
FIG. 1 is a block diagram illustrating one embodiment of a portion of an information handling system operable to receive stylus input according to teachings of the present disclosure.
Figure 2:
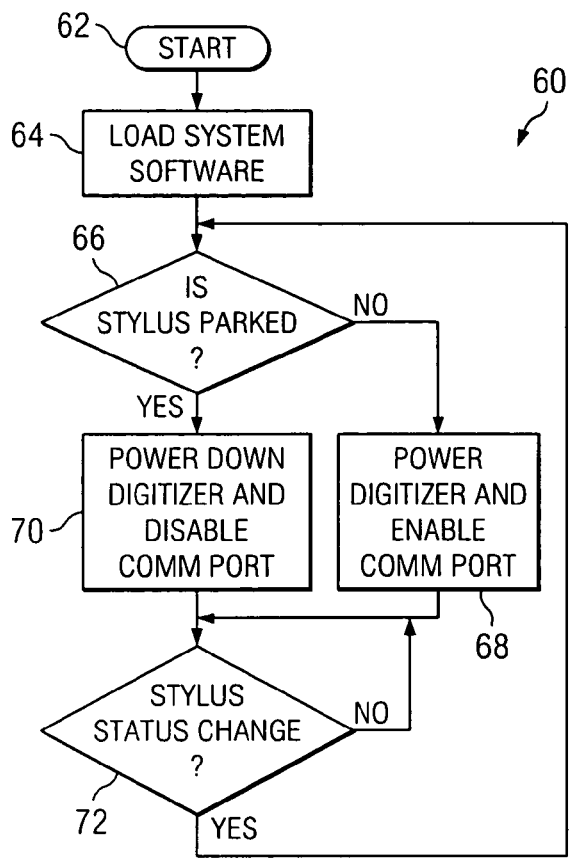
FIG. 2 is a flow diagram depicting one embodiment of a method for managing digitizer power according to teachings of the present disclosure.
Figure 3:
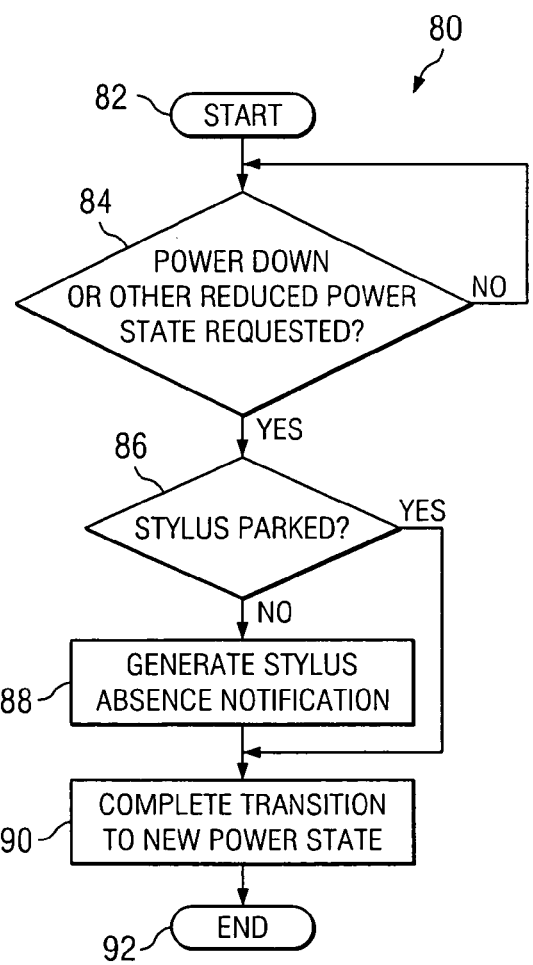
FIG. 3 is a flow diagram of one embodiment of a method for managing stylus allocation on power down of an information handling system according to teachings of the present disclosure.

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to FIG. 1, one embodiment of a portion of an information handling system incorporating teachings of the present disclosure is shown. In general, the information handling system components illustrated in FIG. 1 may be incorporated into a tablet input enabled information handling system, such a tablet PC (personal computer) or a personal digital assistant, as well as a variety of other stylus input based information handling systems.

As illustrated in FIG. 1, one embodiment of an information handling system, such as information handling system 10, preferably includes at least one microprocessor 12. Preferably coupled to microprocessor 12, is one or more memory devices 14. In operation, memory 14 and microprocessor 12 may cooperate to store and execute respectively, one or more programs of instruction for operating one or more aspects of information handling system 10.

Also preferably coupled to microprocessor 12, is nonvolatile random access memory (NVRAM) 16. In general, NVRAM 16 may be defined as a storage system that does not lose data when power is removed. In general, NVRAM may be implemented as ROM (Read Only Memory), EPROM (Electronically Programmable Read Only Memory), flash memory, local memory, battery-backed CMOS (complementary metal-oxide semiconductor) RAM, as well as in other forms.

In one aspect, NVRAM 16 may also include BIOS (Basic Input/Output System) 18. In general, BIOS 18 may be defined as a set of software routines operable to test information handling system (IHS) hardware at start-up, start an operating system (OS) and support the transfer of data among IHS hardware devices. In a preferred embodiment, BIOS 18 is stored in Read Only Memory so that it may be executed when information handling system 10 is powered on. In one aspect, one or more teachings of the present disclosure may be implemented or effected through BIOS 18. In an alternate embodiment, one or more teachings of the present disclosure may be implemented in software storable in memory 14 and executed by microprocessor 12. In still a further embodiment, one or more aspects of BIOS 18 and one or more aspects of a program of instructions storable in memory 14 and executable by microprocessor 12 may be leveraged to effect teachings of the present disclosure.

Also preferably coupled to microprocessor 12 is power management controller 20. Power management controller 20 may be employed in a variety of implementations in association with information handling system 10. For example, power management controller 20 may be responsible for implementing a change between power states of information handling system 10, such as when information handling system 10 is to be transitioned from a fully powered state to a reduced powered state, e.g., going to an S-3, S-4 or S-5 power state from the S-0 state. Further, power management controller may be operably associated with a lid switch (not expressly shown) on a portable information handling system such that power management controller 20 may detect or receive a signal indicating that a lid (not expressly shown) of the information handling system has closed and to thereby alter the operating or a power state of the associated information handling system. Power management controller 20 may be employed in numerous other aspects of the power management of information handling system 10 according to teachings of the present disclosure.

In one aspect of enabling stylus or pen input to information handling system 10, digitizer controller 22 is preferably provided and operably associated with microprocessor 12. In general, digitizer controller 22 preferably couples to a digitizer (not expressly shown) of information handling system 10 and provides at least a portion of the sensing capabilities operable to report the position of a stylus to information handling system 10 which may then translate that data into a cursor position for user input on a display (not expressly shown) of information handling system 10.

In one embodiment of a pen or stylus input enabled information handling system 10, a display of the information handling system may include a glass plate with a metallic coating on one surface thereof. The metallic coating of the glass surface is then disposed proximate a metallic coating on the underside of a layer of Mylar, for example, disposed above the display glass. In operation, pressing the screen with a stylus or pen generally brings the two layers of metallic coating into contact thereby creating an electrical current flow through them. By measuring the electrical current from one or more sides of the display, the information handling system may determine a vertical and horizontal position of the stylus and thereby activate a user selection or display user input. Alternate embodiments of effecting a digitized display operable to receive pen or stylus input may be implemented without departing from the spirit and scope of teachings of the present disclosure. For example, a stylus or pen input device employed with teachings of the present disclosure may be a stylus or pen input device operable to generate signals or selections on information handling system 10 via one or more magnetic fields induced through a powered stylus or pen input device.

Also preferably included in information handling system 10 are one or more stylus garages 24. Stylus garage 24 may be formed in a variety of manners. For example, stylus garage 24 may be embodied as a channel, sleeve, bay, garage, notch, groove, receptacle, clasp, or envelope operable to releasably or removably maintain one or more stylus devices 26.

According to teachings of the present disclosure, stylus garage 24 preferably includes one or more devices, such as magnetic device 28, operable to effect one or more operating aspects of stylus 26. In one embodiment, magnetic device 28 of stylus garage 24 may be configured to cooperate with switch 30 of stylus 26 such that when stylus 26 is parked or maintained in stylus garage 24, switch 30 is opened thereby disengaging stylus power supply 32 from operating stylus 26. In one aspect, the provision of magnetic device 28 in stylus garage 24 and switch 30 of stylus 26 enables the life of power supply 32 preferably included in a powered stylus 26 to be extended as stylus 26 will preferably only be powered when stylus 26 is removed from stylus garage 24 thereby enabling switch 30 to close and stylus power supply 32 to power stylus 26.

In a similar arrangement, stylus 26 may include a device, such as magnetic device 34, operable to affect switch 36 preferably included in stylus garage 24. For example, when stylus 26 is parked or maintained in stylus garage 24, magnetic device 34 preferably affects switch 36 such that switch 36 is either open or closed, depending on implementation. According to teachings of the present disclosure, the signal received by microprocessor 12 from switch 36 may be interpreted such that microprocessor 12 may determine whether parking garage 24 is empty or whether stylus 26 is currently parked in stylus garage 24. For example, when stylus 26 is parked in stylus garage 24, magnetic device 34 may cooperate with switch 36 such that switch 36 closes thereby informing microprocessor 12 that stylus input 26 is parked in stylus garage 24. An alternative embodiment is anticipated in which magnetic device 34 may cause switch 36 to remain open, thereby informing microprocessor 12 when stylus 26 is parked in stylus garage 24. Further, alternative embodiments of switching or signaling mechanisms operable to notify IHS 10 of a parked or non-parked stylus 26 are also contemplated.

Teachings of the present disclosure provide for information handling system 10 and/or components thereof to be operated in a variety of operating or power states depending on whether stylus 26 is parked in stylus garage 24 or whether stylus 26 is removed from stylus garage 24. In one aspect, the presence or parking of stylus 26 in stylus garage 24 may be leveraged in information handling system 10 to indicate that no user input is anticipated and thereby may be leveraged further to permit a digitizer preferably included in information handling system 10 to be powered down as such will not require power to interpret stylus input signals. Accordingly, in one embodiment, microprocessor 12 may determine whether stylus 26 is parked in stylus garage 24 and when parked, may command digitizer controller 22 to reduce power provided to one or more digitizers (not expressly shown) preferably included on information handling system 10 such that a power supply included on information handling system 10 may have its life extended. Similarly, if microprocessor 12 determines that stylus garage 24 does not include one or more styluses 26 parked therein, microprocessor 12 may command digitizer controller 22 to fully power one or more digitizers preferably included on information handling system 10 as the absence of a stylus 26 in stylus garage 24 may suggest that information handling system 10 should or may expect stylus input via the included digitizer.

In another aspect, the ability of microprocessor 12 to determine whether a stylus 26 is parked in stylus garage 24, such as via cooperation of magnetic device 34 preferably included in stylus 26 and switch 36 preferably included parking garage 24, one or more user notifications may be generated informing a user of the absence or a missing stylus 26 from parking garage 24. For example, in response to a request to power down information handling system 10, microprocessor 12 may first determine whether stylus 26 is presently parked in stylus garage 24. If microprocessor 12 determines that stylus 26 is not presently parked in stylus garage 24, microprocessor 12 may command LED (light emitting device) controller 38 to flash one or more LED 40 to inform the user of the misallocated or non-parked stylus 26. In addition to or in lieu of the illumination of one or more LED 40, microprocessor 12 may command audio codec 42 to generate one or more audible signals via speaker 44, for example, informing the user of a misallocated or non-parked stylus 26. Alternative embodiments of generating user notifications as well as alternative scenarios appropriate for the generation of user notifications are anticipated and contemplated within the spirit and scope of the teachings of the present disclosure.

Referring now to FIG. 2, one embodiment of a method for managing power in accordance with the parking status of a stylus is shown according to teachings of the present disclosure. In one aspect, method 60 of FIG. 2 preferably provides for the power management of one or more digitizers preferably included on information handling system 10. However, teachings of method 60 as well as other teachings of the present disclosure may be modified in accordance with other aspects of a stylus based information handling system 10.

Upon booting, starting or otherwise initiating operations on information handling system 10, method 60 preferably proceeds from 62 to 64 where one or more aspects of system software preferably included on information handling system 10 may be loaded. Following the loading of one or more system software components at 64, method 60 preferably proceeds to 66 where a parking status of an information handling system 10 associated stylus 26 may be checked. As mentioned above with reference to FIG. 1, one embodiment of determining whether a stylus is present in a parking garage of an information handling system 10 may be effected through the use of a switch included in stylus garage 24 which is activated in response to the presence of stylus 26 such that microprocessor 12 is aware of the presence of stylus 26 in parking garage 24. In addition to or in lieu of the magnetic device 34 and magnetically responsive switch 36 described above, one or more mechanical switches may be employed to achieve the same or similar functions as that achieved through the use of magnetic device 34 in cooperation with switch 36.

If at 66 it is determined that stylus 26 is presently parked in stylus garage 24, method 60 preferably proceeds to 70 where one or more digitizers preferably included on information handling system 10 may be maintained, migrated or otherwise operated in a reduced power state and one or more communication ports preferably included on information handling system 10 associated with the one or more digitizers may be disabled. Alternatively, at 66 it is determined that stylus 26 is not presently parked in stylus garage 24, method 60 preferably proceeds to 68 where one or more digitizers preferably included on information handling system 10 may be operated in a power state where the one or more digitizers are operable to receive stylus 26 input and one or more communication ports preferably associated with the one or more digitizers may be enabled to communicate such stylus input.

Following operations at 68 and/or 70, method 60 preferably proceeds to 72. At 72, method 60 preferably provides for the substantially continuous monitoring of the parking status of an information handling system 10 stylus 26. If a change in parking status of the stylus is not detected at 72, method 60 preferably loops at 72 until such a parking status change is detected. Upon detection of a stylus parking status change at 72, method 60 preferably returns to 66 where the present parking status of the stylus may again be determined and/or verified and information handling system 10, as well as one or more components thereof, may be operated in a power or operating state associated with the present stylus parking status.

Referring now to FIG. 3, a flow diagram illustrating one embodiment of operating an information handling system 10 or permitting the operation of an information handling system 10 in one or more power or operating states in accordance with the parking status of an information handling system 10 stylus 26 is shown according to teachings of the present disclosure. Method 80 of FIG. 3, according to teachings of the present disclosure, may be leveraged in association with a variety of power state or operating state changes in an information handling system 10. For example, if an information handling system 10 is operated in a power management mode, when information handling system 10 desires to change to a reduced power state, such as in response to a period of IHS inactivity, method 80 may be employed to notify a user of a stylus's absence from parking garage 24. In an alternate embodiment, method 80 may be employed in response to user desired entrance of information handling system 10 into a sleep mode, a power down mode, as well as alternative reduced power states. Alternative utilization of method 80 and the teachings of the present disclosure are also contemplated.

Upon initiation at 82, method 80 preferably proceeds to 84 where information handling system 10 is preferably monitored for detection of the desire to operate information handling system 10 in a reduced power state. As mentioned above, the desire to enter a reduced power state may originate from a user request, from a power management request, such as a request generated by power management controller 20, as well as from other sources. In an embodiment of an information handling system 10 where the information handling system has an operating mode where only stylus input may be received, method 80 may be employed to effect a reduced power state of such an information handling system 10 in response to detection of a parked stylus.

Method 80 preferably loops at 84 if a reduced power state is not requested of information handling system 10. However, in response to detection of a desire to enter information handling system 10 into a reduced power state, method 80 preferably proceeds to 86 where the present parking status of an information handling system 10 stylus 26 may be determined. If at 86 it is determined that stylus 26 is not presently parked in stylus garage 24, method 80 preferably proceeds to 88 where one or more user notifications of the misallocated, or non-parked stylus 26 may be generated. As described above, microprocessor 12 may command LED controller 38 and/or audio codec 42 to generate user notification of the misallocated or non-parked stylus 26 via LED 40 and/or speaker 44, respectively. Following notification of the misallocated or non-parked stylus 26, method 80 preferably proceeds to 90 where the transition of information handling system 10 to an alternate power state may be completed. If at 86, it is determined, such as by microprocessor 12, that stylus 26 is presently parked in stylus garage 24, method 80 preferably proceeds directly to 90 where the transition of information handling system 10 to a new power or operating state may be completed. Following transition of information handling system 10 to a new power or operating state at 90, method 80 may end at 92.

Although the disclosed embodiments have been described in detail, it should be understood that various changes, substitutions and alterations can be made to the embodiments without departing from their spirit and scope.

What is claimed is:

1. An information handling system comprising:
   at least one processor;
   memory operably associated with the processor;
   a stylus garage operably associated with the processor, the stylus garage operable to removably engage at least one stylus;
   a power supply maintained by the stylus;
   the stylus and the stylus garage cooperating to disengage the stylus power supply when the stylus is parked in the garage;
   a digitizer operably coupled to the processor and the memory; and
   the processor operable to determine a parking status of the stylus in the stylus garage and to effect one or more information handling system power states in response to the parking status of the stylus in the stylus garage.

2. The information handling system of claim 1, further comprising:
   a switch operably coupled to the stylus garage; and
   the stylus operable to actuate the switch when parked in the stylus garage.

3. The information handling system of claim 1, further comprising:
   a magnetic switch disposed proximate the stylus garage; and
   a magnetic stylus operable to actuate the magnetic switch when disposed proximate the magnetic switch.

4. The information handling system of claim 1, further comprising:
   a magnetic device disposed proximate the stylus garage; and
   the magnetic device operable to actuate a magnetic switch in the stylus such that the stylus may be powered down when parked.

5. The information handling system of claim 1, further comprising the processor operable to effect operation of the digitizer in a reduced power mode when the stylus is parked in the stylus garage.

6. The information handling system of claim 1, further comprising the processor operable to effect operation of the digitizer in an input mode when the stylus is not parked in the stylus garage.

7. The information handling system of claim 1, further comprising the processor operable to generate at least one user notification of a non-parked stylus in response to a request to power down the information handling system.

8. Software for managing power in an information handling system, the software embodied in computer readable media and when executed operable to:
   determine whether at least one stylus is parked in a stylus garage of the information handling system;
   disengage a power supply maintained by the stylus when the stylus is parked in the garage; and
   permit operation of the information handling system in one or more operating states depending on results of a stylus parking determination.

9. The software of claim 8, further operable to operate a digitizer in a reduced power state when the stylus is parked in the stylus garage.

10. The software of claim 8, further operable to operate a digitizer in an input mode when the stylus is not parked in the stylus garage.

11. The software of claim 8, further operable to monitor the stylus garage for a change in stylus parking status.

12. The software of claim 11, further operable to alter the one or more operating state of the information handling system in response to the change in stylus parking status.

13. The software of claim 8, farther operable to generate a notification response to a request for power down of the information handling system and the determination that the stylus is not parked in the stylus garage.

14. A method for powering an information handling system, comprising:
maintaining availability of a plurality of information handling system operating states;
effecting a selected operating state according to a stylus parking status in an information handling system stylus garage; and
disengaging a stylus power supply while the stylus is parked in the stylus garage.

15. The method of claim 14, further comprising monitoring the stylus garage for a change in the stylus parking status.

16. The method of claim 14, further comprising powering a stylus input digitizer for input operations in response to a determination of a non-parked stylus.

17. The method of claim 14, further comprising powering down a stylus input digitizer in response to determination of a parked stylus.

18. The method of claim 14, further comprising:
determining the stylus parking status in response to a request to power down the information handling system; and
generating a stylus absence notification in response to an empty stylus garage.

* * * * *